United States Patent
Johnson et al.

(10) Patent No.: US 9,975,633 B1
(45) Date of Patent: May 22, 2018

(54) COLLAPSIBLE DUCTED FAN UNMANNED AERIAL SYSTEM

(71) Applicant: NORTHROP GRUMMAN SYSTEMS CORPORATION, Falls Church, VA (US)

(72) Inventors: Stephen D. Johnson, Laguna Niguel, CA (US); Barnaby S. Wainfan, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 469 days.

(21) Appl. No.: 15/151,287

(22) Filed: May 10, 2016

(51) Int. Cl.
| B64C 39/02 | (2006.01) |
| B64C 3/00 | (2006.01) |
| B64C 7/02 | (2006.01) |
| B64C 11/00 | (2006.01) |

(52) U.S. Cl.
CPC .............. *B64C 39/024* (2013.01); *B64C 3/00* (2013.01); *B64C 7/02* (2013.01); *B64C 11/001* (2013.01); *B64C 2201/104* (2013.01)

(58) Field of Classification Search
CPC ........ B64C 39/024; B64C 11/001; B64C 7/02
See application file for complete search history.

(56) References Cited

U.S. PATENT DOCUMENTS

| 3,054,578 A | 9/1962 | Brocard |
| 3,083,934 A | 4/1963 | Vanderlip |
| 3,139,244 A | 6/1964 | Bright |
| 3,524,611 A | 8/1970 | Frank |
| 3,658,278 A | 4/1972 | Batchelor |
| 4,114,837 A | 9/1978 | Pavlecka et al. |
| 4,121,606 A * | 10/1978 | Holland ................ B64D 33/02 137/15.1 |
| 4,685,640 A | 8/1987 | Warringtion et al. |
| 5,071,383 A | 12/1991 | Kinoshita |
| 5,295,643 A | 3/1994 | Ebbert et al. |
| 7,581,608 B2 | 9/2009 | St. Louis |
| 7,712,701 B1 | 5/2010 | Ehrmantraut et al. |
| 8,128,019 B2 | 3/2012 | Annati et al. |

(Continued)

FOREIGN PATENT DOCUMENTS

| DE | 100 23 269 A1 | 11/2001 |
| EP | 0 201 309 A2 | 11/1986 |

(Continued)

*Primary Examiner* — Brian M O'Hara
*Assistant Examiner* — Keith L Dixon
(74) *Attorney, Agent, or Firm* — John A. Miller; Shumaker, Loop & Kendrick, LLP

(57) ABSTRACT

A ducted fan UAV that can be collapsed into a stowed configuration and then deployed for flight by, for example, inflating the duct to a deployed configuration. The UAV includes a plurality of rotor blades, a plurality of struts and a plurality of control vanes each being pivotally mounted to a center body by a hinge so that the rotor blades, the struts and the control vanes can be folded into the stowed configuration to be substantially parallel to the center body and be unfolded into the deployed configuration to be substantially perpendicular to the center body. The UAV also includes a pressurization system providing a pressurant to a chamber within the duct so as to inflate the duct and cause the struts, the rotor blades and the control vanes to move from the stowed configuration to the deployed configuration.

20 Claims, 3 Drawing Sheets

(56) References Cited

U.S. PATENT DOCUMENTS

| | | | |
|---|---|---|---|
| 8,342,442 B1 | 1/2013 | Dancila | |
| 8,821,123 B2 * | 9/2014 | Camci | F01D 25/26 |
| | | | 416/189 |
| 2005/0082421 A1 | 4/2005 | Perlo et al. | |
| 2008/0210778 A1 * | 9/2008 | Colosimo | F02K 1/827 |
| | | | 239/265.19 |
| 2010/0068052 A1 * | 3/2010 | Werle | F03D 1/04 |
| | | | 415/220 |

FOREIGN PATENT DOCUMENTS

| | | |
|---|---|---|
| FR | 2 539 383 A1 | 7/1984 |
| WO | 2015/000088 A1 | 1/2015 |

* cited by examiner

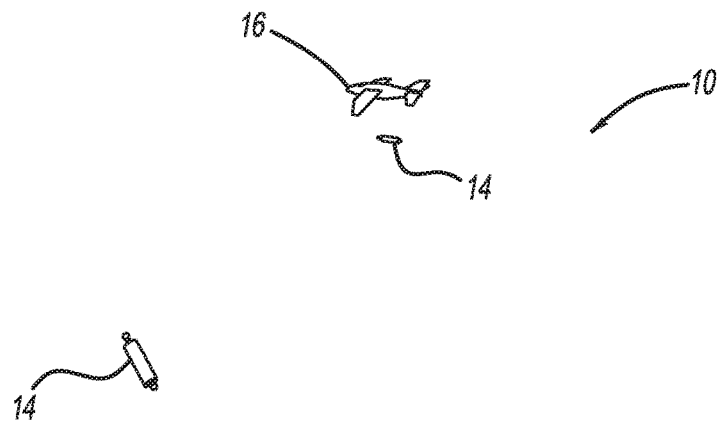
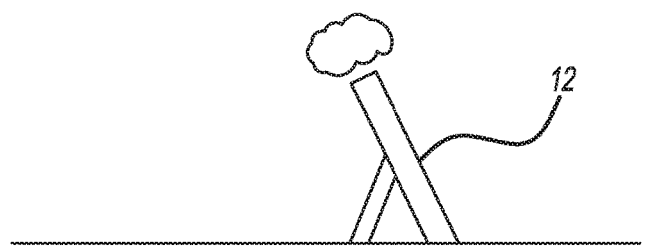
FIG - 1
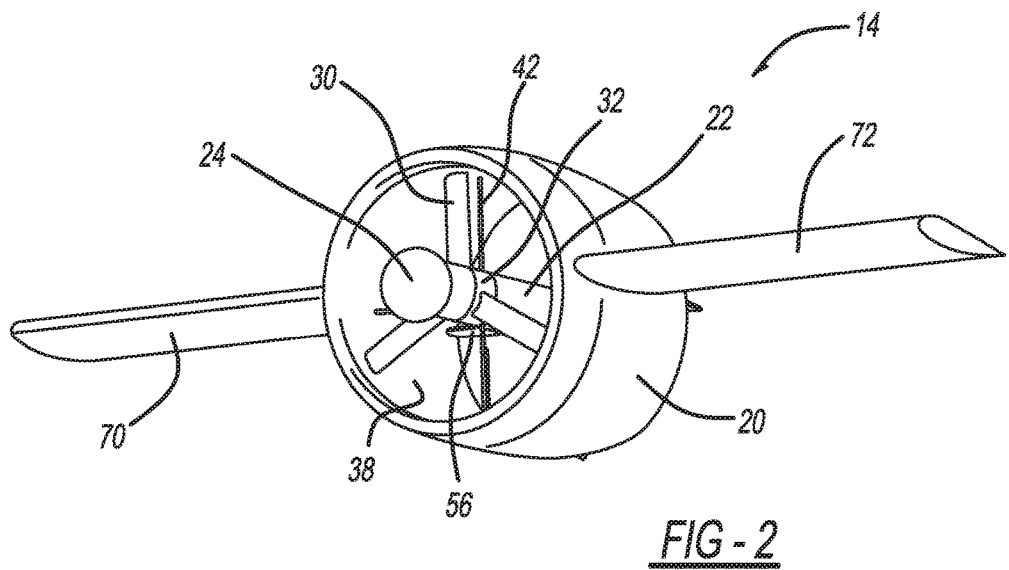
FIG - 2

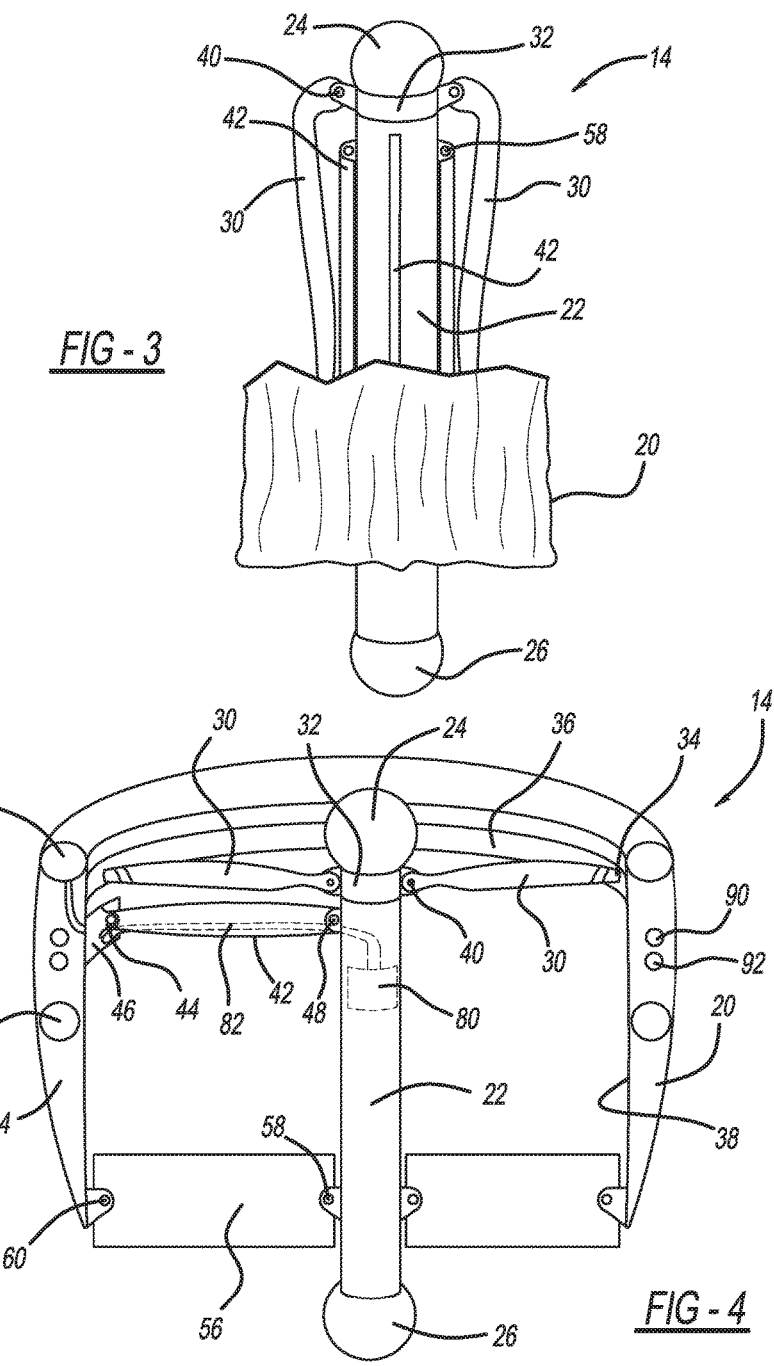

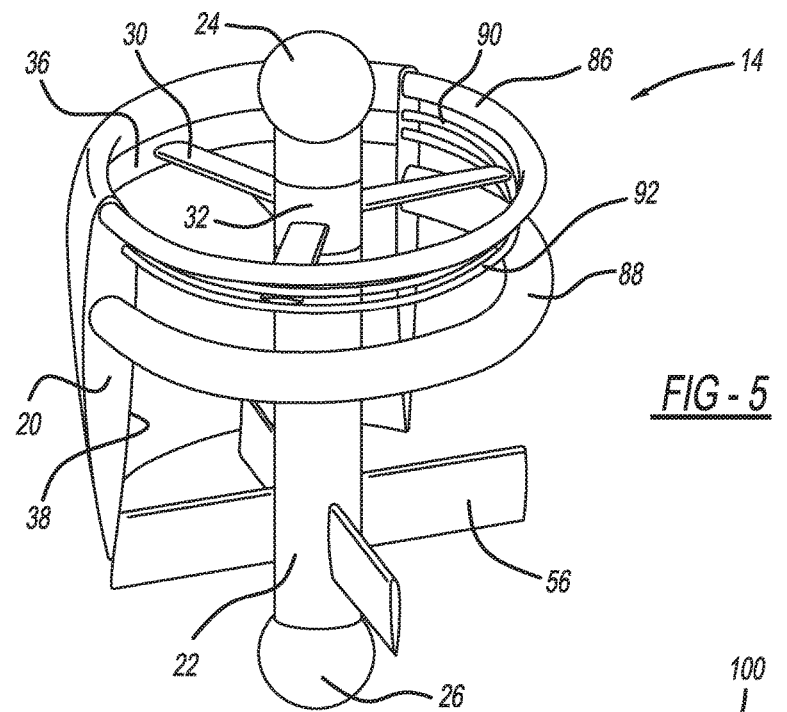
FIG-5
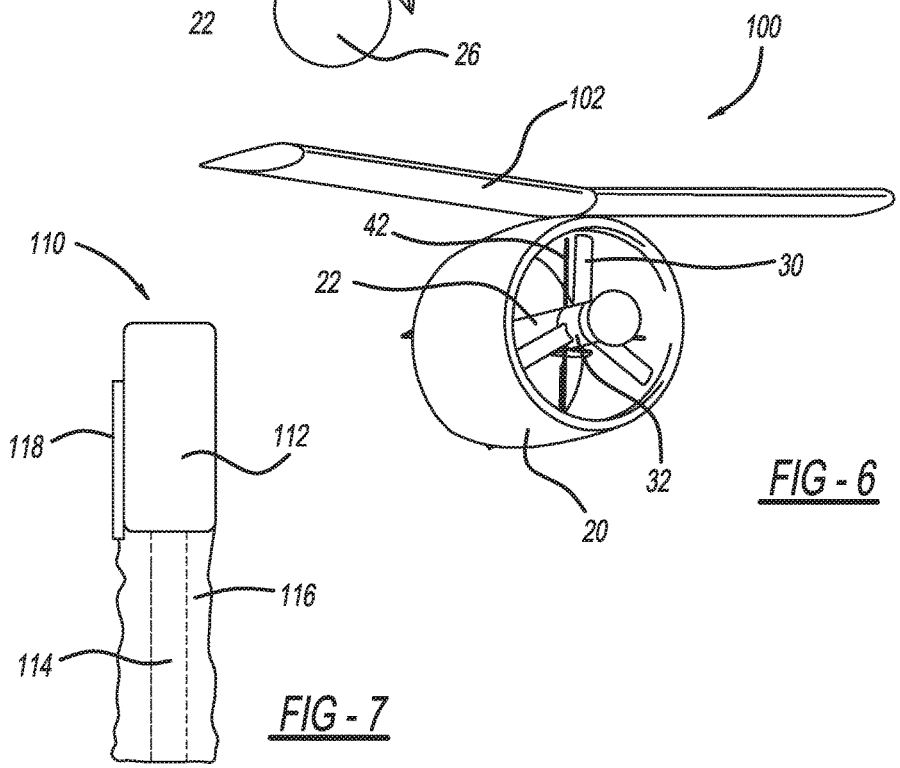
FIG-6
FIG-7

COLLAPSIBLE DUCTED FAN UNMANNED AERIAL SYSTEM

BACKGROUND

Field

This invention relates generally to an unmanned aerial vehicle (UAV) that includes a ducted propulsion fan and, more particularly, to a UAV that includes a collapsible ducted propulsion fan provided in a stowed configuration for launch or transport and then deployed to a flight configuration after launch or for lift off.

Discussion

UAVs are known in the art that can be remotely controlled during flight or be controlled by an onboard control system that has been pre-programmed. UAVs have many applications including military applications, such as for surveillance, reconnaissance, target accusation, etc., and civilian applications, such as for data gathering during natural disasters. Depending on the application, a UAV can be equipped with many and various payloads, such as detectors, sensors, cameras, communications devices, munitions, etc. UAVs are typically launched from various platforms, such as ground platforms, other aircraft, ships, etc.

UAVs typically have one or more rotor systems that may be driven by various types of propulsion systems, such as internal combustion engines, electric drive motors, gas turbine engines, etc. Some UAVs have propulsion systems that employ a ducted fan that provides various advantages such as reduced power for a particular thrust, the opportunity for lower acoustic emissions, operational safety, etc. The efficiency of thrust generation increases rapidly with an increase in the diameter of the duct. However, providing ducted fans on UAVs has the disadvantage that the duct is relatively large and bulky, and as such is limited in its ability to be transported in large numbers and they must be launched in their flight configuration, which precludes launch of the vehicle in, for example, a small-diameter launch tube.

Many types of ducted fan UAVs are vertical takeoff and landing (VTOL) vehicles that takeoff from the ground, ships, etc., where they fly to perform their mission in both a vertical and lateral direction. However, it may be desired to carry multiple UAVs on a single platform, such as an aircraft or a ship, where it would be desirable to conserve space by providing the UAVs in a collapsed and stowed configuration to later be deployed prior to launch or in the air after being launched. Thus, a need exists to provide a reliably collapsible and deployable ducted fan UAV, where duct diameters several times the length of the vehicle may be possible.

SUMMARY

The present invention discloses and describes a ducted fan UAV that can be collapsed into a stowed configuration and then deployed for flight by, for example, inflating the duct to a deployed configuration. The UAV includes a plurality of rotor blades each being rotatably mounted to a center body by a hinge so that the rotor blades can be folded into the stowed configuration to be substantially parallel to the center body and be unfolded into the deployed configuration to be substantially perpendicular to the center body. The UAV also includes a plurality of struts each being pivotally mounted to the center body and an inside surface of the duct by hinges so that the struts can also be folded into the stowed configuration to be substantially parallel to the center body and also be unfolded into the deployed configuration to be substantially perpendicular to the center body. The UAV also includes a plurality of control vanes each being rotatably and pivotally mounted to the center body and the inside surface of the duct by hinges so that the control vanes can also be folded into the stowed configuration to be substantially parallel to the center body and also be unfolded into the deployed configuration to be substantially perpendicular to the center body. The UAV also includes a pressurization system providing a pressurant to a chamber within the duct so as to inflate the duct and cause the struts, the rotor blades and the control vanes to move from the stowed configuration to the deployed configuration.

Additional features of the present invention will become apparent from the following description and appended claims, taken in conjunction with the accompanying drawings.

BRIEF DESCRIPTION OF THE DRAWING

FIG. 1 is an illustration of a stowed ducted fan UAV being launched from a ground launcher and being dropped from an aircraft;

FIG. 2 is an isometric view of the deployed UAV in horizontal flight;

FIG. 3 is a side view of the ducted fan UAV in a collapsed and stowed configuration;

FIG. 4 is a cross-sectional side view of the ducted fan UAV in a deployed configuration;

FIG. 5 is a cut-away, isometric view of the ducted fan UAV;

FIG. 6 is an isometric view of a top-wing ducted fan UAV; and

FIG. 7 is a side view of a ducted fan UAV in a stowed configuration and having a larger diameter payload section.

DETAILED DESCRIPTION OF THE EMBODIMENTS

The following discussion of the embodiments of the invention directed to a collapsible ducted fan UAV is merely exemplary in nature, and is in no way intended to limit the invention or its applications or uses.

The present invention proposes a ducted fan UAV that has various applications and can be collapsed into a stowed configuration, where the duct of the UAV is deflated prior to launch and then deployed therefrom for flight. In one embodiment, the UAV is launched from, for example, a ground launcher, an aircraft or a ship in its stowed configuration, and then once released is deployed in a manner of seconds by inflating the duct, which causes the various support and flight controls to be deployed into their flight configuration. In another embodiment, the collapsed and stowed UAV is provided in the stowed configuration for transport and once it is at its launch location is deployed prior to launch, where it may operate as a VTOL vehicle.

As mentioned, the ducted fan UAV of the invention can be launched in its stowed configuration, where it is deployed for flight once it is in the air. This embodiment is generally represented by illustration 10 shown in FIG. 1. The illustration 10 shows a ground launcher 12 that has launched a ducted fan UAV 14 into the air, where the UAV 14 is shown in its collapsed configuration prior to being deployed, and where that deployment will occur some distance from the launcher 12 depending on the particular application. Additionally, the UAV 14 can be launched or dropped from any suitable aircraft 16 once it is proximate its mission position.

FIG. 2 is an isometric view of the UAV 14 in its deployed configuration and in horizontal flight after it has been launched or where it flies as a VTOL vehicle. FIG. 3 is a side view of the UAV 14 in a collapsed configuration, FIG. 4 is a broken-away side view of the UAV 14 in the deployed configuration and FIG. 5 is a broken-away isometric view of the UAV 14 in the deployed configuration.

The UAV 14 includes a collapsible cylindrical duct 20, shown broken-away in FIG. 3, formed around a center column body 22 including spherical ends 24 and 26 that will in combination house the various payloads, pressurants, control systems, engines, drive motors, sensors, etc., as will be discussed in more detail below. The duct 20 can be made of any material suitable for the purposes discussed herein, such as carbon fiber impregnated Mylar. In this non-limiting embodiment, the cross-sectional shape of the duct 20 has a general airfoil configuration in that it has a wider front end in its flight direction and a narrower back end. A set of rotor blades 30, here three, are rotatably coupled to the center body 22 on a rotating motor drive 32 and provide the propulsion for maneuvering and flying the UAV 14. Further, the blades 30 are pivotally mounted to the motor drive 32 by spring-loaded hinges 40 so that they can be positioned substantially parallel to the center body 22 when in the stowed configuration and be substantially perpendicular to the center body 22 when in the deployed configuration. Outer tips 34 of the rotor blades 30 are provided as close as possible to a resilient strip 36 mounted to an inside surface 38 of the duct 20 to provide efficient operation of the blades 30 and without providing significant wear to the duct 20.

A set of duct support struts 42, here four, are pivotally secured to hard supports 46 mounted to the inside surface 38 of the duct 20 by single-axis hinges 44 and are pivotally secured to the center body 22 by single-axis hinges 48, which provide support for the duct 20 after it has been deployed, so that they can be positioned substantially parallel to the center body 22 when in the stowed configuration and be substantially perpendicular to the center body 22 when in the deployed configuration. The number of the struts 42 used in the design will be chosen to provide the accuracy needed for centering and adjusting rotor tip clearance. Prior to deployment, the struts 42 and the blades 30 are held constant at their initial positions, which allows clearance for proper deployment. Alternatively, the folding and deployment directions of the struts 42 and the rotor blades 30 can be chosen to be opposite in order to de-conflict their individual deployment.

A series of control vanes 56, here four, are pivotally mounted to the center body 22 and the duct 20, and provide an aerodynamic control surface for steering the UAV 14 while in flight. The control vanes 56 are pivotally mounted to the center body 22 by two-axis hinges 58 and to the inside surface 38 of the duct 20 by two-axis hinges 60 so that they can be positioned substantially parallel to the center body 22 when in the stowed configuration and be substantially perpendicular to the center body 22 when in the deployed configuration. The control vanes 56 provide aerodynamic control for not only steering the UAV 14, but also for countering the rotation of the rotor blades 30. In an alternate embodiment, the counter rotation of the rotor blades 30 can be corrected by another set of rotor blades (not shown) that are mounted coaxial with the rotor blades 30, but on a concentric shaft (not shown) for providing counter rotation. The counter rotating rotor blades can be provided at opposite ends of the UAV 14 or in some designs at the same end or middle of the UAV 14.

Wings 70 and 72 are mounted to and extend from the duct 20 and provide lift when the UAV 14 is operating in horizontal flight. Although not specifically shown, the wings 70 and 72 would include a suitable pivoting mechanism that allows the wings 70 and 72 to be folded to be substantially parallel to the duct 20 when in the stowed configuration, and which are then deployable to be substantially perpendicular to the deployed duct 20, where the wings 70 and 72 would be locked in this position for flight. It is noted that the wings 70 and 72 are not shown in FIGS. 3-5 merely for clarity purposes, where the wings 70 and 72 may be optional in other embodiments.

A source 80 of a suitable pressurant positioned within the center body 22 provides an inflating material through fill tubes 82 in the struts 42 that fill an internal chamber 84 in the duct 20, where the chamber 84 of the duct 20 may be a configuration of many chambers, some of which may be filled with a high pressure material, and some of which may be filled with a low pressure material. The shape of the duct 20 can be maintained with low to moderate pressure and in some situations, some parts of the duct 20 may not require internal pressurization. Each particular detailed design of the duct 20 will contain either inflated or passively deployed portions of the duct 20. A pressurization system, if required, and to save weight, may deploy a minimum application of compressed gas in a cylinder, inlet and exit ducts, passive or throttle-controlled, that interact with free stream flow and/or fan induced or discharged flow.

It is noted that discussion herein refers to the duct 20 being inflated from a stowed configuration to a deployed configuration. However, in other embodiments, the duct 20 may deployed from the stowed or collapsed configuration using mechanical systems, such as spring devices that may include rib-like supports that can be collapsed or folded and deployed from the collapsed orientation.

The rotor tip clearance is very important in ducted fan performance and the inflatable envelope of the duct 20 must be precise. To help achieve this, the internal chamber 84 of the duct 20 may include larger toroidal-shaped high-pressure inflatable tubes 86 and 88 and smaller toroidal-shaped high-pressure inflatable tubes 90 and 92 provided at strategic locations within the chamber 84 that can be inflated with a higher pressure than the remaining part of the chamber 84 and provide support for the duct 20. Pressure in the toroidal tubes 86, 88, 90 and 92 may be varied to achieve control of the rotor tip clearance or to more closely achieve the required circular shape.

Any suitable mechanism or triggering element can be provided to inflate the duct 20 from its stowed configuration to its deployed configuration either prior to lift off or after being placed in the air from the launcher 12 or the aircraft 16. When the pressurant is released from the source 80 and fills the chamber 84 and the tubes 86, 88, 90 and 92, the duct 20 begins to inflate and expand. During this deployment process, the blades 30 are lifted from their stowed position substantially parallel to the center body 22 as shown in FIG. 3 to their deployed position using the spring-loaded hinges 40. Further, the struts 42 are lifted from their stowed position substantially parallel to the center body 22 shown in FIG. 3 to the deployed position shown in FIG. 4 on the single-axis hinges 44 and 48. Likewise, the control vanes 56 are lifted from their stowed configuration substantially parallel to the center body 22 to their deployed configuration substantially perpendicular to the center body 22 on the hinges 58 and 60. Once the duct 20 is fully inflated and in its deployed configuration, the drive motor 32 is turned on to rotate the blades 30 and provide the propulsion. It is noted that for certain designs of the UAV 14, the UAV 14 can include suitable mechanisms for deflating the duct 20 and returning it to its stowed configuration for later deployment.

FIG. 6 is an isometric view of a UAV 100, similar to the UAV 14, where like elements are identified by the same reference number. In this design, the wings 70 and 72 are replaced with a top-wing 102 that may have better application for certain missions.

In the embodiment discussed above, the duct 20 is stowed in an axial position along almost the entire length of the center body 22. In an alternate embodiment that may require larger payloads, a larger center body portion may be required where the collapsed duct is positioned axial therewith. FIG. 7 is a side view of a UAV 110 showing this embodiment that includes a payload section 112 positioned on top of a center body 114 where a stowed duct 116 is positioned axial with the payload section 112 and a rotor blade 118 is shown mounted to the section 112.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An aircraft comprising:
   a center body;
   a duct including a chamber that is operable to be inflated to inflate the duct from a stowed configuration to a deployed configuration;
   a plurality of rotor blades each being pivotally and rotatably mounted to the center body on a drive by a hinge so that the rotor blades can be folded into the stowed configuration to be substantially parallel to the center body and be unfolded into the deployed configuration to be substantially perpendicular to the center body, wherein the plurality of blades are positioned between the center body and the duct;
   a plurality of struts each being pivotally mounted to the center body and an inside surface of the duct by hinges so that the struts can be folded into the stowed configuration to be substantially parallel to the center body and be unfolded into the deployed configuration to be substantially perpendicular to the center body, wherein the plurality of struts are positioned between the center body and the duct;
   a plurality of control vanes each being pivotally mounted to the center body and the inside surface of the duct by hinges so that the control vanes can be folded into the stowed configuration to be substantially parallel to the center body and be unfolded into the deployed configuration to be substantially perpendicular to the center body, wherein the plurality of control vanes are positioned between the center body and the duct; and
   a pressurization system providing a pressurant to the chamber within the duct so as to inflate the duct and cause the struts, the rotor blades and the control vanes to move from the stowed configuration to the deployed configuration.

2. The aircraft according to claim 1 wherein the pressurization system includes a source of the pressurant located within the center body and at least one tube coupled to the source and extending through at least one of the struts to the chamber.

3. The aircraft according to claim 1 further comprising a wear resistant strip positioned on the inside surface of the duct proximate to tips of the rotor blades in the deployed configuration.

4. The aircraft according to claim 1 further comprising at least one toroidal-shaped high pressure inflatable support tube positioned within the chamber.

5. The aircraft according to claim 1 wherein the duct has a general airfoil shape with a wider forward portion and a narrower rear portion when in the deployed configuration.

6. The aircraft according to claim 1 wherein the plurality of rotor blades is three rotor blades, the plurality of struts is four struts and the plurality of control vanes is four control vanes.

7. The aircraft according to claim 1 wherein the hinges mounting the rotor blades to the center body are spring loaded single-axis hinges, the hinges mounting the struts to the center body and the duct are single-axis hinges, and the hinges mounting the control vanes to the center body and the duct are two-axis hinges.

8. The aircraft according to claim 1 wherein the center body includes spherical ends for storing a payload.

9. The aircraft according to claim 1 wherein the center body includes a larger diameter payload portion and a lower narrow diameter portion to which the rotor blades, the struts and the control vanes are mounted.

10. The aircraft according to claim 1 further comprising at least one wing mounted to an outside surface of the duct.

11. The aircraft according to claim 10 wherein the at least one wing is a single top wing.

12. The aircraft according to claim 10 wherein the at least one wing is two wings positioned on opposite sides of the duct.

13. The aircraft according to claim 1 wherein the aircraft is an unmanned aircraft.

14. The aircraft according to claim 13 wherein the aircraft is a vertical takeoff and landing (VTOL) aircraft.

15. An unmanned aerial vehicle (UAV) comprising a center body and a duct secured to the center body and including a chamber that is inflatable to inflate the duct from a stowed configuration to a deployed configuration.

16. The UAV according to claim 15 further comprising at least one toroidal-shaped high pressure inflatable support tube positioned within the chamber.

17. The UAV according to claim 15 further comprising a plurality of rotor blades coupled to the center body, a plurality of struts coupled to the center body and the duct, and a plurality of control vanes coupled to the center body and the duct.

18. The aircraft according to claim 17 wherein the plurality of rotor blades are pivotally and rotatably coupled to the center body by spring loaded single-axis hinges, the plurality of rotor struts are pivotally coupled to the center body and the duct by single-axis hinges, and the plurality of control vanes are pivotally coupled to the center body and the duct by two-axis hinges.

19. An unmanned aerial vehicle (UAV) comprising:
   a center body;
   a duct that is operable to be deployed from a stowed configuration to a deployed configuration;
   a plurality of rotor blades each being pivotally and rotatably mounted to the center body on a drive by a hinge so that the rotor blades can be folded into the stowed configuration to be substantially parallel to the center body and be unfolded into the deployed configuration to be substantially perpendicular to the center body, wherein the plurality of blades are positioned between the center body and the duct; and a plurality of struts each being pivotally mounted to the center body and an inside surface of the duct by hinges so that the struts can be folded into the stowed configuration to be substantially parallel to the center body and be unfolded into the deployed configuration to be substantially perpendicular to the center body, wherein the plurality of struts are positioned between the center body and the duct.

20. The UAV according to claim 19 wherein the duct is deployed from the stowed configuration by inflating the duct or by a mechanical system.

\* \* \* \* \*